United States Patent
Rittenbach

[11] B 3,983,558
[45] Sept. 28, 1976

[54] MOVING TARGET INDICATING (MTI) RADAR SYSTEMS EMPLOYING VEHICLE DISCRIMINATOR APPARATUS

[75] Inventor: Otto E. Rittenbach, Neptune, N.J.

[73] Assignee: The United States of America as represented by the Secretary of the Army, Washington, D.C.

[22] Filed: June 28, 1974

[21] Appl. No.: 484,029

[44] Published under the second Trial Voluntary Protest Program on February 10, 1976 as document No. B 484,029.

[52] U.S. Cl. .............................. 343/7.7; 340/258 A; 343/5 PD; 343/5 SA
[51] Int. Cl.² ...................... G01S 9/42; G08B 13/22
[58] Field of Search ............... 343/7.7, 5 SA, 5 PD; 340/258 A

[56] References Cited
UNITED STATES PATENTS

| | | | |
|---|---|---|---|
| 3,098,971 | 7/1963 | Richardson | 343/6.8 R X |
| 3,150,363 | 9/1964 | Finvold | 343/5 SA |
| 3,181,150 | 4/1965 | Ruppersberg et al. | 340/258 A |
| 3,383,678 | 5/1968 | Palmer | 343/7.7 X |
| 3,431,405 | 3/1969 | Dawson | 343/5 SA |
| 3,631,489 | 12/1971 | Cooper | 343/7.7 |
| 3,636,562 | 1/1972 | Wehner | 343/5 SA |
| 3,719,945 | 3/1973 | Sletten et al. | 343/5 SA |
| 3,725,917 | 4/1973 | Sletten et al. | 343/5 SA |

*Primary Examiner*—Malcolm F. Hubler
*Attorney, Agent, or Firm*—Nathan Edelberg; Sheldon Kanars; Michael Zelenka

[57] ABSTRACT

There is disclosed a radar system of the type employing a receiver capable of responding to a signal reflected from a moving target, which signal includes a doppler frequency component indicative of target motion. Included therewith are means for responding to an even harmonic component of said returned signal to provide an indication of the magnitude of the same, the magnitude of said even harmonic component indicative of the nature of said vehicle, as, for example, whether said vehicle is a tracked type (tank) or a wheeled type (automobile).

13 Claims, 9 Drawing Figures

COSINE OF SECOND HARMONIC PLUS COSINE OF BASIC WAVE

Fig. 2A.

SINE OF SECOND HARMONIC PLUS SINE OF BASIC WAVE

Fig. 2B.

SINE OF THIRD HARMONIC PLUS COSINE OF BASIC WAVE

[DISCRIMINATOR WAVEFORMS]

MOVING TARGET INDICATING (MTI) RADAR SYSTEMS EMPLOYING VEHICLE DISCRIMINATOR APPARATUS

The invention described herein may be manufactured and used by or for the Government for governmental purposes without the payment of any royalties thereon or therefor.

BACKGROUND OF THE INVENTION

This invention relates in general to radar systems and more particularly to a MTI radar system capable of determining the presence of moving targets while further providing vehicle identification.

A primary object of any radar employing moving-target indication (MTI) is to present to the user signals in a manner that moving targets will show up, while stationary objects give no response. MTI systems have been in widespread use and many such prior art devices employed a pulsed radar system in conjunction with a plan-position indicator (PPI) display. See, for example, a text entitled "Radar System Engineering" edited by Louis N. Ridenour, Volume I of Massachusetts Institute of Technology (Radiation Laboratory Series), Chapter 16 entitled MOVING-TARGET INDICATION.

Basically, the method of reception employed in a MTI system utilizes the well known doppler effect to determine target movement. The systems employed in the prior art can also furnish range information by modulating or chopping the transmitted signal and relying on the fact that stationary targets exhibit constant phase from pulse to pulse and therefore a steady amplitude as compared to the varying phase and amplitude of moving targets.

There exists a number of general descriptions and mathematical analysis of the characteristics of MTI systems as well as system operation. See, for example a text entitled AIRBORNE RADAR by Donald J. Povejsil, et al. published in 1965 by Boston Technical Publishers, Inc., pages 269 to 272.

In spite of the progress made in developing more sophisticated radar systems and display techniques, an outstanding problem in MTI radar is the tactically important ability of the system to discriminate between wheeled and tracked vehicles or to distinguish, for example, between a conventional automobile or jeep and a tank.

Trained operators, when employing aural detection, can identify tracked vehicles via the Doppler return only under special circumstances. These dictate illumination of the target by the transmitter at predetermined angles for receiving large return signals from the tracks, while maintaining a high signal to noise ratio.

If one uses a multiple doppler channel system, then each return channel is associated with a separate operator and the above technique is highly impractical. As is understood, the prior art schemes depend greatly upon the ability and discretion of the operator. Thus, the determination or discrimination between a tank and a jeep becomes at best an educated guess.

It is therefore an object of the present invention to provide a MTI radar system capable of reliably discriminating between wheeled and tracked vehicles by providing improved automatic detection circuits.

BRIEF DESCRIPTION OF THE PRREFERRED EMBODIMENT

The radar system is of the type capable of receiving a return or echo signal reflected from a target within the range of a radar transmitter, wherein said returned signal includes a doppler frequency component containing information relative to the nature or type of target, in combination therewith, apparatus for identifying the type of target, comprising first means included in said receiver and responsive to the reception of said returned signal for detecting the magnitude of even harmonic components of said doppler component at an output thereof and means coupled to the output of said first means for providing a control signal when said magnitude of said even harmonic components exceed a predetermined level indicative of the presence of a moving target of said given type.

DETAILED DESCRIPTION OF THE FIGURES

Before proceeding with a description of the appended figures, a few basic comments concerning the operating characteristics and theory of the invention will be given.

By utilizing the well known technique of spectrum analysis of the doppler signal or of the doppler signature characteristics of both tracked and wheeled vehicles, one can readily ascertain that the rigid part of the vehicle (frame) provides a relatively strong doppler component. Associated with this relatively strong signal are sizable second harmonic signals which are due to and caused by the upper portions of the tires or tracks which move at twice the speed of the vehicle. Generally such frequency components due to tracks, are usually more pronounced than those due to wheels, although there is a definite overlap in their relative magnitudes.

If one operates the system with a vertically polarized signal and selects the proper frequency range (wavelength large compared with the depth of the tire treads; i.e. a frequency 1 GHz or lower), then one can substantially reduce or remove this undesirable overlap.

In addition to the magnitude of the second harmonic, its relationship to the magnitude of the basic doppler is a useful criterion. This is so as certain parameters as range, shadowing, ground lobing and precipitation have often equal effects on both the stronger and secondary doppler signals. If the relation between the basic doppler signal and the secondary signal is greater than a predetermined value and the basic doppler signal exceeds a minimum value, then one need not monitor or check the magnitude of the second harmonic since it must then be at least equal to that ratio times the minimum doppler magnitude.

Figure 1:
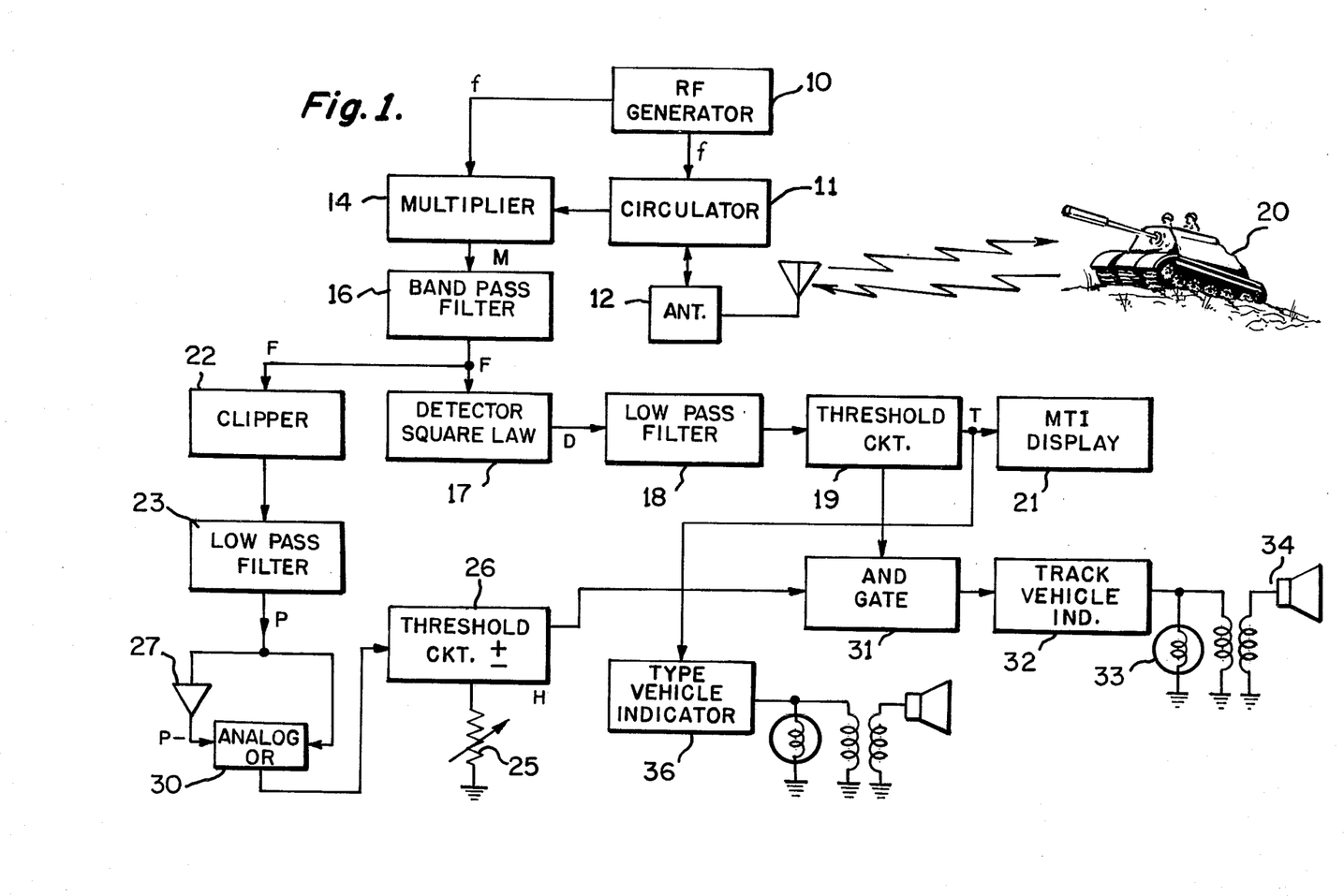
FIG. 1 is a block diagram of a single channel doppler system incorporating vehicle identification apparatus according to the invention.

Referring to FIG. 1, there is shown a block diagram of a radar system of a single doppler channel configuration. The system to be described is generally an even harmonic detection system capable of vehicle discrimination. At the onset, it is understood that other system techniques, as will be explained, can be utilized as well.

The block diagram of FIG. 1 depicts a simple block diagram of a relatively conventional unmodulated continuous wave (CW) radar system. The RF generator 10, which can be a klystron oscillator, a GUNN effect device or any other frequency generator capable of operating in a frequency range of 1 GHz or lower, supplies an output frequency of $f$, to a port of the circulator 11 associated with and coupled to a receiving and transmitting antenna 12. The circulator, as indicated, is a multi-port device (3) which basically is a non-reciprocal network, characterized by non-reciprocal coupling properties such that a signal entering one port is coupled to a second port, a signal entering a second port is coupled to a succeeding port and so on, while a signal entering the last or $n$th port, depending upon the number of ports is coupled to a first port.

Such circulators 11, are commonly used to advantage in a receiving-transmitting system or a radar system to permit a single antenna as 12 to serve both as the receiving and transmitting antenna. The circulators 11 are commercially available and may be fabricated using stripline techniques in combination with ferrite components or ordinary microwave guides.

Therefore, the output of the RF generator 10 is applied to the antenna 12 via circulator 11, at the frequency of $f$. The antenna 12 radiates the energy coupled thereto at an amplitude of cos Wt. Hence, by the well known doppler effect, the echo received, also via antenna 12, from the rigid part of a moving vehicle 20 is (1) $A \cos ((W-w) t-a)$ where:

$A$ is proportional to the amplitude of the body return
$w$ represents the body shift due to the radial speed
$a$ is the relative phase angle
$W = 2\pi f =$ frequency of RF generator.

If the target vehicle 20 rides on tracks, the upper part of the tracks (traveling at twice the vehicle speed) produce an additional return of: $B \cos ((W-2w)t-b)$ where $B$ is the amplitude of the return
$2w$ is the doppler shift
$b$ is the relative phase angle The sum of the received signals is coupled via the circulator 11 to the multiplier circuit 14. The multiplier may receive the reference signal 2 cos Wt directly from the RF generator 10, which signal may be applied directly or via an isolating amplifier. The multiplier circuit 14 is a well known circuit and essentially performs a linear multiplication of two input signals to provide a multiplied signal or product, at the output. Various modulators, mixers as well as operational amplifiers and integrated circuit configurations can perform accordingly.

Thus, the output of multiplier 14 is M where:
$M = [A \cos ((W-W)t-a) + B \cos ((W-2w)t-b)] 2 \cos Wt$
$= A \cos ((2W-w)t-a) + B \cos ((2W-2w)t-b) + A \cos (wt+a) + B \cos (2w+b)$ The signal M is coupled to a bandpass filter 16, which passes only the low frequency components of the signal M. Thus the output of the bandpass filter 16 is the doppler signal components $F$; where:
$F = A \cos (wt+a) + B \cos (2 wt+b)$ The doppler signal F is then squared by the detector 17. The detector 17 utilizes a square-law device such as a diode or the base to emitter junction of a transistor to provide at its output, the signal D which is the doppler signal multiplied by itself or the squared doppler signal $F^2$. The detector 17 has coupled to its output a low pass filter 18 which provides at its output the signal $T$ where:
$T = \overline{F^2} = (A^2+B^2)/2$ The output signal from the low pass filter 18 is applied via a threshold circuit 19 to the MOVING-TARGET INDICATOR display 21. The threshold detector 19 may be a diode circuit or a biased amplifier and permits signals above a predetermined noise threshold to be displayed on the MTI display which may be a CRT display or an audio display. Basically, the development of the signal T determines the presence of a moving vehicle due to the combined doppler signal.

VEHICLE IDENTIFICATION

Thusfar, there has been described the apparatus for determining a moving target as compared to a stationary one. To afford and provide vehicle identification, the doppler signal F, as obtained from the bandpass filter 16 is applied to a wave shaper such as the clipper or clipping circuit 22.

Basically a clipping circuit may comprise two or more diodes suitably biased and placed back to back. The clipper serves to "clip" or limit the sinusoidal excursions of the F signal as applied thereto to provide at its output a signal designated as SGN $F$ where:
SGN $F =$ signum $F = F/|F| = \pm 1$ Referring to FIG. 2A, there is shown a graph of the cosine waveforms of the second harmonic (cos2wt) plus the cosine waveform of the basic waveform.

Figure 2A:
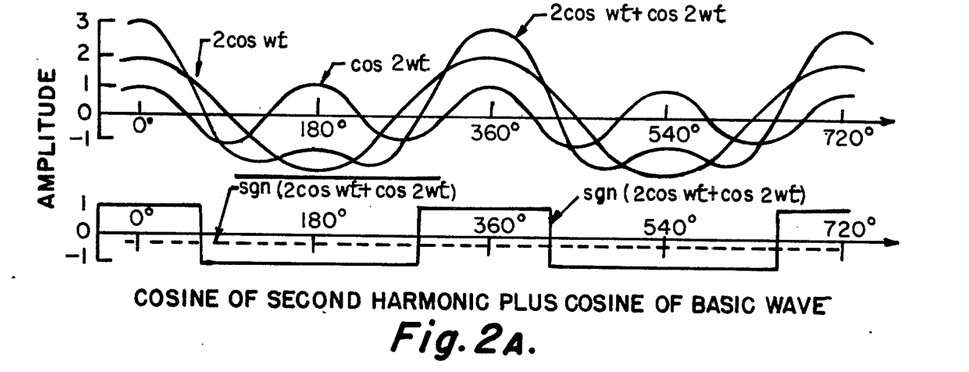
FIGS. 2A to 2C are a series of wavform diagrams useful in explaining the operation of the system depicted.

The output of the clipper 22 is shown beneath the sinusoidal waveforms. Hence, one can visualize the relation of the signals processed by the apparatus. The signal cos Wt is representative of the reference signal $f$, while 2cos Wt is representative of the signal used as a reference to the multiplier. The signal 2 cos $wt$ + cos 2 $wt$ is representative of the received doppler sum signal. This sum signal is primarily indicative of the F signal and the clipped F signal is shown below as, sgn (2 cos $wt$ + cos 2 $wt$). The zero crossings of the sgn signals occur at $F = 0$.

As can be seen from FIG. 2A, the maximum unsymmetry occurs when:
2 $(wt+a) =$ 2 $wt+b$ or $2a = b$ Therefore the zero crossings occur at $0 =$ sgn $F = A \cos (wt+a) + B(2\cos^2 (wt+a)-1) = 0$, or:
$\cos (wt+a) = (-1+ \sqrt{1+2I (2B/A)^2})A/(4B)$
$= \sin (wt+a-90°)$
$= -\sin \Delta \approx B/A$ where $wt+a-90° = \Delta$ and is the difference as compared to a symmetrical square wave.

Since
$wt+a \approx 90°$ for $B << A$ then
$\Delta \approx - 180° B/(A\pi)$

Figure 2B:
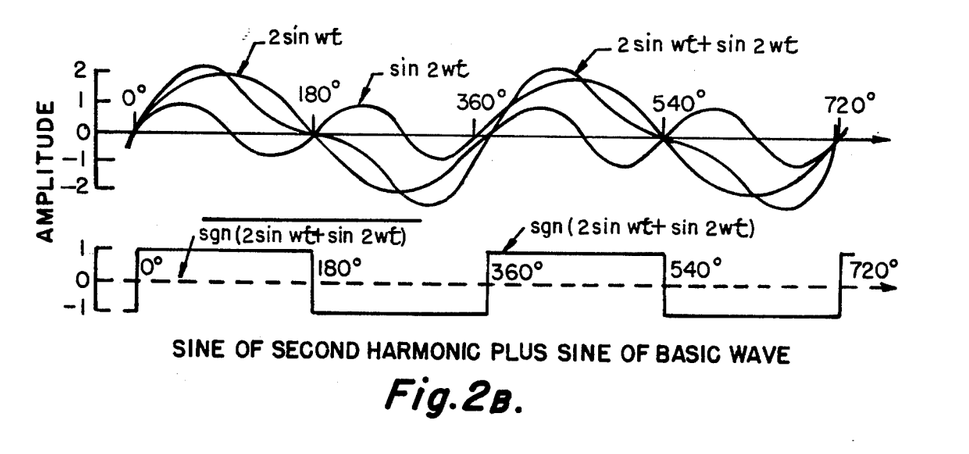

Therefore the maximum value of the clipped doppler signal out of the low pass filter 23 is
$P\max = \overline{\text{sgn } F} \approx 2 \Delta /360° \approx + 2B/(A\pi)$ The relationship of the sine wave configurations are shown in FIG. 2B.

Thus it can be understood that the technique employed detects the presence of second harmonic signals present in the doppler signal F as received; and by monitoring the amplitude of such signals, an indication of the type of vehicle can be ascertained.

The output from the low pass filter 23 is applied to a threshold circuit 26, which may have an adjustable threshold value shown schematically by potentiometer 25.

Before application to the threshold circuit 26, which may be a similar configuration to the threshold circuit 19, the P signal is inverted by means of an amplifier or inverter 27. Thus one obtains a P signal 180 degrees out of phase with the true P signal. This signal is designated as −P. The −P and P signal are applied to inputs of an analog "OR" gate 30. The output of the OR gate 30 is applied to the input of the adjustable threshold detector 26.

As can be seen from FIG. 2B (sine wave), there is no unsymmetry for $2a−b = ±90°$, since all zero crossings of the lower frequency wave are in synchronization with the zero crossings of the higher frequency wave.

Figure 2C:
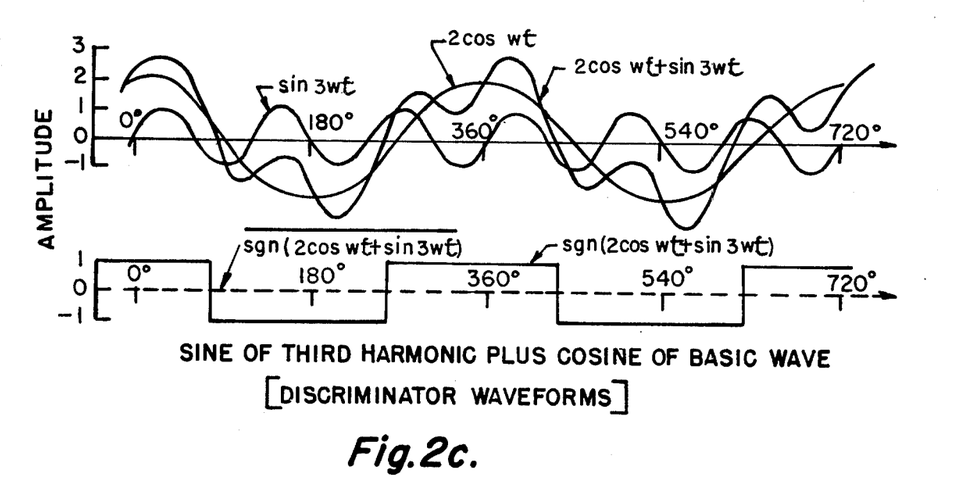

In general, the processed signal P is:
$P −2(\cos(2a−b)) B/(A\pi) \approx −0.64 (\cos(2a−b)) B/A$ Referring to FIG. 2C, one can see that zero crossing shifts caused by third harmonics have about the same magnitude, but occur in the same direction and therefore do not change the average value of the clipped wave. The same is true for all odd harmonics, but the processing circuitry is sensitive to the fourth and higher even harmonics. These harmonics are lower in amplitude than the second and do not affect the results. Nonintegral harmonics of the basic waveform give no output.

Hence the signal P out of the low pass filter 23 is applied as P and −P to the analog OR gate 30. The OR gate operates to provide the larger signal at its output. For example, the P signal as defined at its maximum conditions is the average value or D.C. component of the F signum signal. Essentially, the output of the low pass filter 23 has a DC component, which is the desired signal. Thus, assume the output of the low pass 23 had a D.C. component of plus 2 volts (+2v). The inverter 27 would provide a −P signal of −2 volts while the P signal would be +2 volts. Since +2 is larger than −2, the analog OR gate 30 would provide the +2 volt signal at its output. If the D.C. component at the output of the low pass 23 were −3 volts, the inverter 27 would provide a +3 volt signal (−P) and the P would be −3. Therefore, the gate 30 would provide the +3 or −P signal. The output of the gate 30 would always be of the same polarity and would represent the greater signal P or −P. The threshold detector 26 has the threshold level H. Therefore it will respond only when the P signal is less than −H or greater than H.

The output of the threshold detector 26 may be applied to one input of an AND gate 31, and the other input of AND gate 31 is obtained directly from the threshold circuit 19 associated with the moving target indicator channel.

Thus, the AND gate 31 will provide a signal output only when the following conditions are present:
1. There is a moving target; and
2. There is a second harmonic component of this moving target which exceeds the threshold level (L) of threshold 26.

Thus, the output of AND gate 31 signifies the presence of a moving vehicle which is, in fact, a tracked vehicle. The output of the AND gate 31 is applied to a TRACK VEHICLE indicator circuit 32, which may be a relay, silicon controlled rectifier, amplifier and so on. The energization of the indicator 32 causes a light source 33 or a speaker 34 or some other type of display device to indicate this fact to the operator directly.

The AND gate 31 serves to reduce the false alarm rate caused by noise and interference, since in the embodiment shown a tracked vehicle is only indicated by the indicator 32 when the AND gate 31 is activated.

The threshold level H of circuit 26 is preset for a tolerable probability of false alarms caused by wheeled vehicles of certain types, noise and other spurious interference.

In any event, the output of the threshold detector 19 could also be applied directly to a vehicle indicator circuit 36. This circuit could determine the presence of fast moving vehicle as compared for example, to slow moving vehicles or determine the presence of moving ground vehicles as compared to airplanes, helicopters, and so on.

QUADRATURE DOPPLER PHASE SYSTEM

Figure 3:
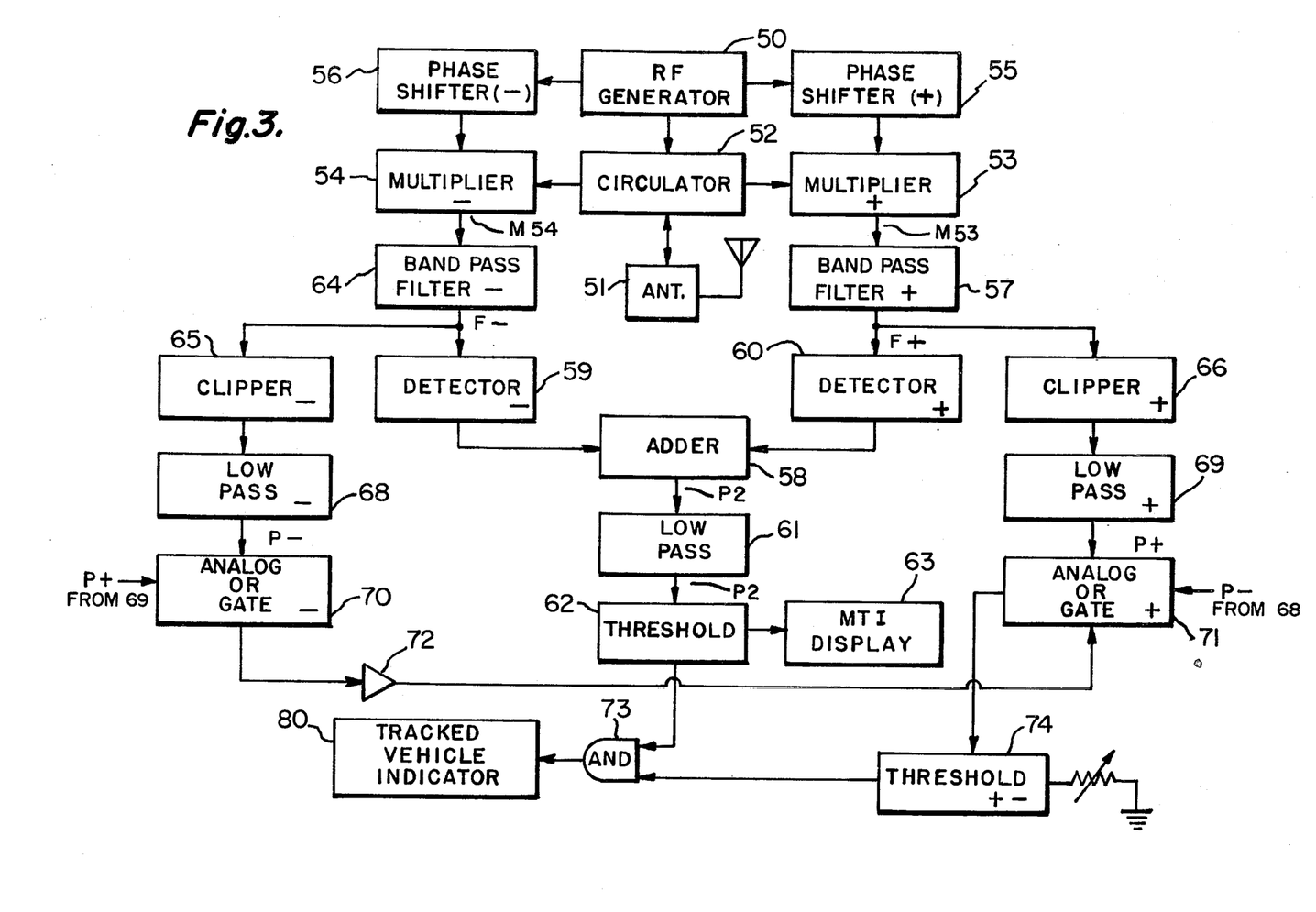
FIG. 3 is a block diagram of a quadrature type radar system according to this invention.

Referring to FIG. 3, there is shown a quadrature doppler channel system.

In the description associated with FIG. 1 of a single phase doppler channel, there can be "fading" or signal strength variation due to the angle dependence of the processed signal P which provides no output for:
$\cos(2a−b) = 0$ or $2a−b = ±90°$ If two out-of-phase detections are used, the probability of detection increases by:
$1−(1−p)^2 = p(2−p)$ $2p$ for $p$ 1 where $p$ = probability factor and assuming independence of detection.

There is also an increase of the false alarm rate by a factor of two times, since twice the number of thresholds are provided.

Referring to FIG. 3, there is shown a simplified block diagram of an unmodulated continuous wave (CW) radar.

An RF generator or oscillator 50 of frequency W supplies an antenna 51 via a circulator 52 in much the same manner as above described. The circulator 52 (a four port device) supplies the frequency to be transmitted by the antenna with the radiated energy of amplitude cosW$t$. The antenna also behaves as a receiving antenna and will receive the return echo from an outgoing tracked vehicle of:
Return signal = $A \cos((W−w)t−a) + B \cos((W−2w)t−b)$ This signal is applied via the circulator 52 to the multiplier 53 (+) and the multiplier 54 (−) due to the coupling of an input thereof to the associated circulator ports.

The multipliers 53 and 54 receive their respective reference signals via the phase shifters 55 and 56 (+ and −) from the RF generator 50 signal.

The respective reference signals for multiplier 54 and multiplier 55 are:
Reference Signal to 53 = 2 cos (W$t$+45°)
Reference Signal to 54 = 2 cos (W$t$−45°)

The output of the multipliers 53 and 54 are:
$M_{53} = A \cos((2W−w)t−a−45°) + B \cos((2W−2w)t−b−45°) + A \cos(wt+a+45°) + B \cos(2wt+b+45°)$
$M_{54} = A \cos((2w−w)t−a+45°) + B \cos((2W−2w)t−b30\ 45°) + A \cos(wt+a−45°) + B \cos(2wt+b−45°)$ The bandpass filters 57 and 64 receive the $M_{54}$ and $M_{53}$ signals and serve to filter and pass only the doppler signal components designated as F− and F+. These signals can be detected and processed many ways, one way is shown in FIG. 3. The F− and F+ signals available at the output of bandpass 64 and bandpass 57 have the same form as the F signal from bandpass filter 16 of FIG. 1, but differ by a phase angle of ±45°.

Both the F– and F+ signals may be added as a signal by means of the analog adder circuit 58. The adder 58 may be a single stage operational amplifier circuit or a resistor adder and an amplifier. The addition as shown occurs after the respective square law detection of the F– and F+ signals by the square law detectors 59 and 60, respectively. Thus the output signal from adder 58 is the processed signal $P_2$ equal to:

$$P_2 = F-^2 + F+^2$$

The adder signal is again applied via a low pass filter 61 and thence to a threshold detector 62 to determine that the target was, in fact, a moving target as previously described.

The threshold detector or circuit 62 operates as the threshold circuit 19 of FIG. 1, and the output is applied directly to the MTI display 63, thus informing the operator of the presence of a moving target.

VEHICLE DISCRIMINATION

Since the F+ and F– signals available respectively at the outputs of bandpass filter 56 and 57 are in quadrature (±45°), they are fed directly into the clippers (– and +) 65 and 66. These serve the same function as clipper 22 of FIG. 1.

The output of clippers 65 and 66 are coupled to low pass filters 68 and 69 respectively to provide at the output a P– and a P+ signal, these signals are represented by:

$$P- \approx -0.64 [\cos(2a-b - 45°)] B/A$$
$$P+ \approx -0.64 [\cos(2a-b + 45°)] B/A$$

The P– and P+ signals are fed into two inputs of analog OR gates 70 and 71, which operate as the gate circuit 30 of FIG. 1. The inverter 72 inverts the signal emanating from gate 70 to permit the analog gate 71 to be used as the output gate. Thus, the most positive signal P– or P+ is passed by gate 71 to activate the threshold detector 74 when its threshold limit (H) is exceeded.

This output signal of threshold detector 74 may again be applied to an input of AND gate 73, the other input being derived from the threshold circuit 62.

The activation of AND gate 73 again determines a tracked moving target. The advantages of the above described system being that because of the increased number of threshold circuits and analog gates, one increases the probability of a signal detection above that for a single channel system as in FIG. 1, and as above described.

The activation of AND gate 73 can then energize the tracked vehicle indicator 80, notifying and apprising the operator that the vehicle detected is, for example, a tank and is similar in operation to the circuitry depicted in FIG. 1.

Figure 4:
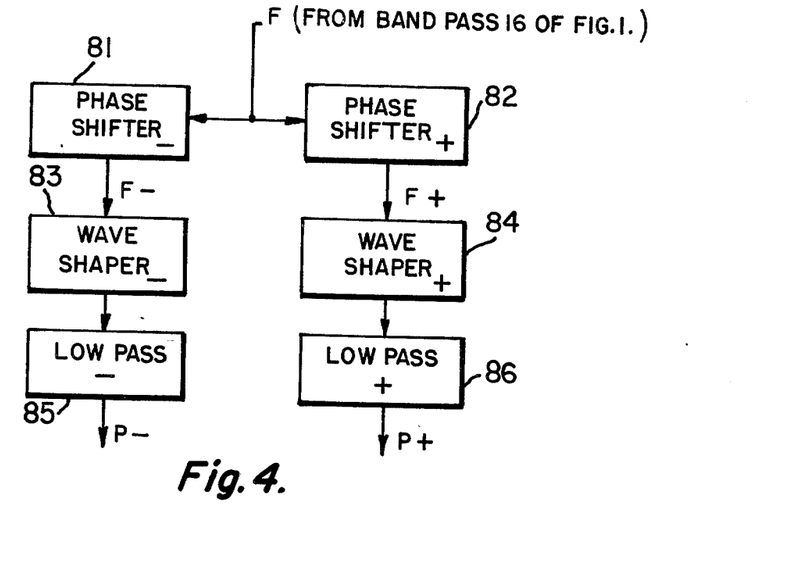
FIG. 4 is a block diagram of an alternate technique for processing signals necessary for this invention.

Referring to FIG. 4, there is shown an alternate way of processing the doppler signal F from a single channel system (FIG. 1) to improve the probability of detection.

The signal F as developed at the output of the bandpass filter 16 of FIG. 1 is applied respectively to a first quadrature phase shifter 81 (–) and a second quadrature phase shifter 82 (+). The signals provided at the outputs of phase shifters are F– and F+ where:

$$F\mp = A \cos(wt+a+\phi\mp45°) + B \cos(2wt+b+\phi+45°)$$

where:
$\phi$ = phase angle common to both phase shifters.

The signals F– and F+ are again clipped or processed by waveshapers 83 and 84 and the low pass filters 85 and 86 provide at their outputs the P– and P+ signals; where:

$$P\pm \approx 0.64 (\cos(2a+b+\phi \pm 45°)) B/A.$$

The P+ and P– signals can be processed as shown in FIG. 3 to provide tracked vehicle indication.

In this scheme four threshold levels are used, twice as many as in FIG. 1; making the miss rate even lower.

Thus, one obtains an increased probability of detection in a quadrature processing system even when employing a single channel doppler system.

It is noted that modules 83 and 84 instead of being referenced as clippers, are indicated by the more generic term waveshapers. Basically, the term waveshapers is used to indicate that in lieu of an actual clipping circuit, one can use a phase locked loop or a third power detector to obtain the basic doppler frequency. This is of course true for the clipper 22 in FIG. 1, clipper 65 and 66 in FIG. 3 and in all similar places in the other figures. In a phase locked loop, the VCO or voltage controlled oscillator amplitude would be squared by means of a square law detector. Its output is then correlated by multiplying it with the doppler signal, and a low pass filter is used to provide a signal proportional to the relation of the two doppler components.

The phase locked loop processor does not respond to higher harmonics and its noise performance is relatively independent of frequency.

In a third power detector scheme, the combined doppler signal plus noise may be squared followed by multiplication. The output is terminated in a low pass filter. To obtain the above described relation between the doppler components, a strong AGC is employed in front of the phase locked loop and the third power detector. The AGC voltage is used as a reference for the threshold level H.

The third power detector does not respond to harmonics higher than the second and hence, its noise performance is also relatively independent of frequency.

Figure 5:
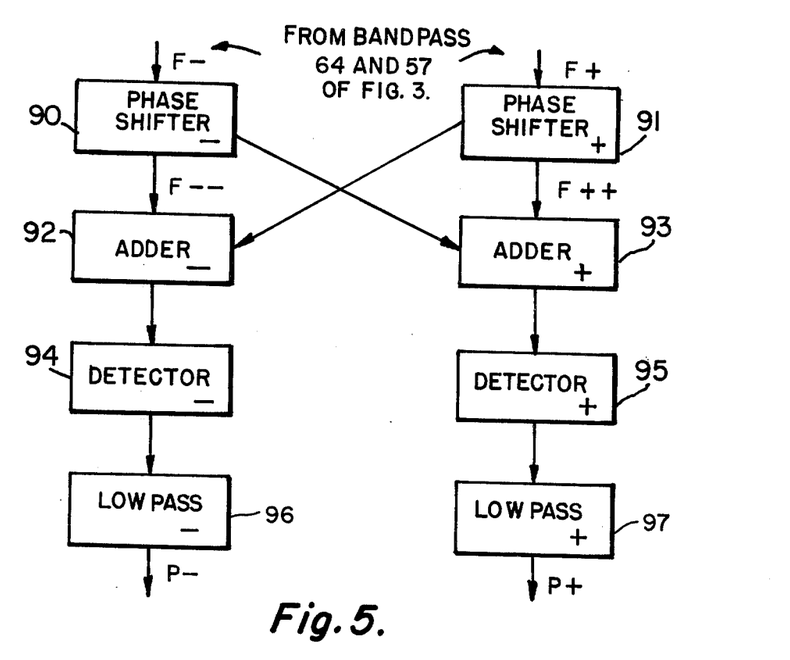
FIG. 5 is a block diagram of a further embodiment of processing circuitry according to the invention.

Referring to FIG. 5, there is shown an alternate way of detecting and separating moving target information based upon a quadrature phase shifting scheme. Here the F– and F+ signals as provided in FIG. 3 from the outputs of bandpass filters 64 and 57 are applied into two quadrature phase shifters 90 and 91 respectively (– and +). The phase shifters shift the F± signals by $\phi\mp45°$ to provide:

$$F\mp\mp = \mp(A \sin(wt+a+\phi) + B \sin(2wt+b+\phi))$$

Both the F– – and F+ + signals are subtracted, respectively added in adders (+ and –) 92 and 93 to provide at the outputs:

$$F++ - F-- = -2F-- = 2(A \sin(wt+a+\phi) + B \sin(2wt+b+\phi))$$

The above signal is obtained from adder 92. The signals out of adder 93 cancel, as:

$$F++ + F-- = 0$$

The signals are fed to square law detectors 94 and 95 which provide at the outputs of low pass filters 96 and 97 the average value of $(-2F--)^2 = 2(A^2 + B^2)$ which is approximately equal to $2A^2$.

The signal to noise ratio is again improved since noise emanating from one sideband is cancelled.

Figure 6:
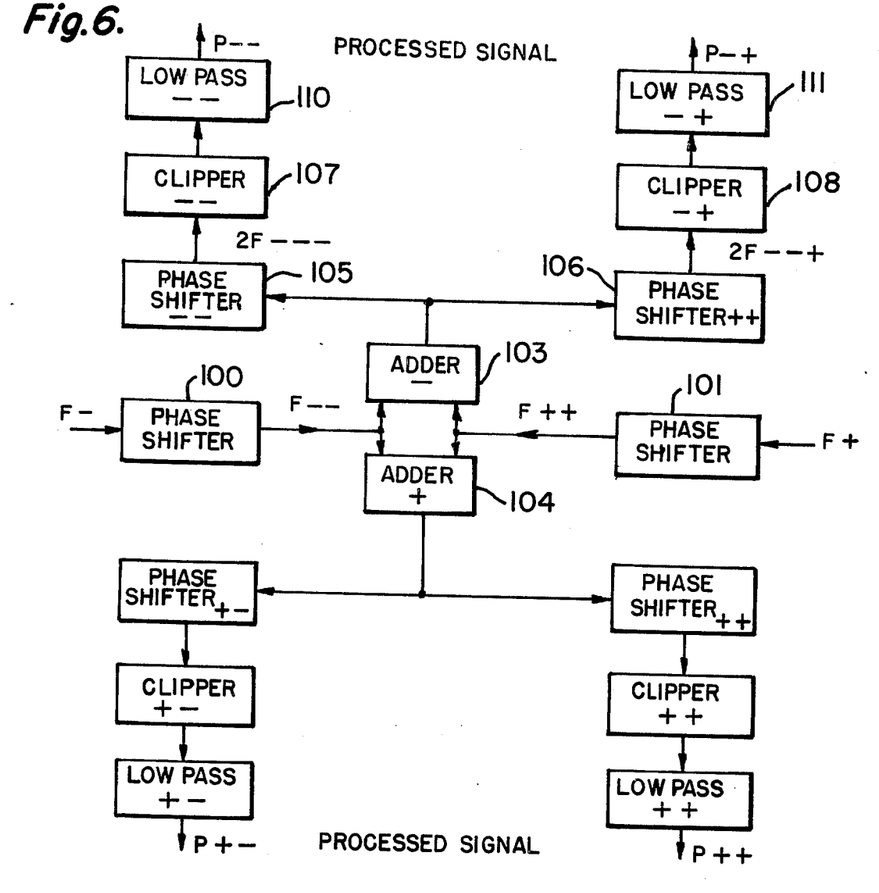
FIG. 6 is a block diagram of still an additional embodiment of developing a quadrature signal to this invention.

Another way of performing vehicle discrimination is depicted in FIG. 6. The F+ and F– signals as derived from the bandpass filters 64 and 57 of FIG. 3, are directed to the input of a first phase shifter (–) 100 and a second phase shifter (+) 101. The phase shifters 100 and 101 provide the phase shift of $\phi\pm45°$ providing a F– – and a F+ + signal where:

$F \mp \mp = \mp (A \sin (wt+a+\phi) + B \sin (2wt+b+\phi))$

These signals are applied to two adders 103 and 104. Adder 103 is a subtractor or a negative adder while 104 is a positive adder. Hence the output of adder 103 is:
$F + + - F - - = 2(A \sin (wt+a+\phi) + B \sin (2wt+b+\phi))$
$= 2F - -$ The signals are cancelled in adder 104 as:
$F + + + F - - = 0$ The signal from adder 103 is the one directed through an additional pair of phase shifters 105 and 106 (− − and + +) producing:
$2F - - \mp = 2 (A \sin (wt+a+2\phi \mp 45°) + B \sin (2wt+b+2\phi \mp 45°)$ These signals are directed to a clipper 107 (− −) and a clipper 108 (−+) and thence through the low pass filters 110 and 111 to give a P−− and a P−+ signal where:
$P - \mp = 2F - - \pm \approx -0.64 (\cos(2a-b+2\phi \mp 45°)) B/A$ These signals P − +, P − +, P + − and P + + can be processed as indicated above but two circuits for the four signals are needed, both identical to the circuit of FIG. 3 for P + and P −.

Figure 7:
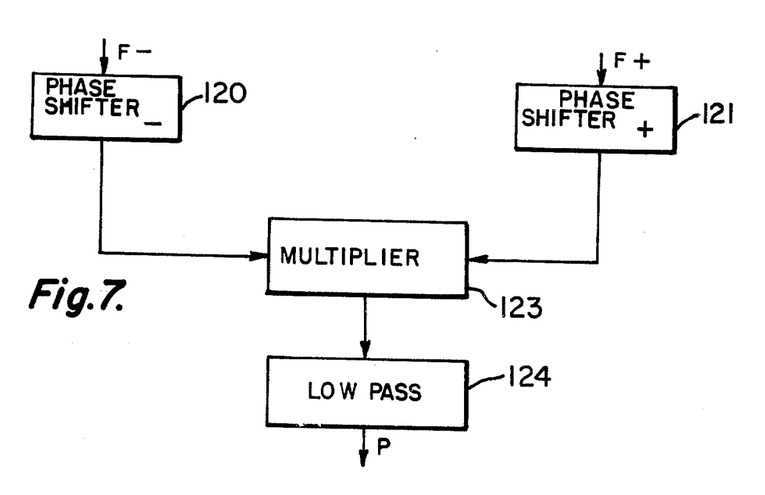
FIG. 7 is a block diagram of a further embodiment.

Alternatively, one can use a balanced processing scheme to determine the average value of the signal (FIG. 7). Here the F− and F+ signals as derived from bandpass circuits of FIG. 3 are applied respectively to a first phase shifter (−) 120 and a second phase shifter (+) 121. The phase shifters 120 and 121 shift the F− and F+ and are shifted by $\phi \mp 45°$. These shifted signals are then multiplied by the multiplier 123, which may have a similar configuration to multiplier 54 of FIG. 1. The output of multiplier 123 is:
$(F--) (F++) = - (A \sin (wt+a+\phi) + B \sin (2wt+b+\phi))^2$.

Only the d.c. or average term is passed or propagated by the low pass filter 124 to produce the P signal where:
$P = \overline{(F--)} \overline{(F++)} = -(A^2+B^2)/2 \approx -A^2/2$ A target moving in the opposite direction will cause an opposite polarity output. This feature cancels oscillatory moving clutter returns.

The balanced detector can be used with the vehicle discriminator circuitry shown in the prior figures to process the P signal.

The approach can be used with coarse range resolution radar systems or high resolution systems. One can employ matched filter banks as the doppler signal can be approximated by a sinusoidal wave, hence tracking filters or digitally tuned filters can be utilized as well to detect even harmonic components.

Many other modifications will become apparent to those skilled in the art without departing from the spirit and scope of the invention as evidenced by the claims appended hereto.

What is claimed is:

1. In a moving target indicator radar system of the type employing a transmiter which generates a signal free of harmonics and a receiver capable of responding to a transmitted return signal from a vehicle which return signal includes a Doppler component related to the motion of said vehicle, in combination therewith an apparatus for identifying the nature of said target, comprising:
   a. means responsive to said return signal to determine the magnitude of any even harmonic content thereof, which content is determinative of the nature of said vehicle to provide an output signal respresentative of said harmonic signal; and
   b. means responsive to said output signal for providing an indication of the nature of said vehicle to thereby inform an operator of said radar system of the same.

2. The apparatus according to claim 1 wherein said even harmonic is the second harmonic.

3. In a moving target indicator radar system of the type including a receiver capable of responding to a return or echo signal reflected from a target within the range of a radar transmitter, which generates a signal free of harmonics, wherein said returned signal includes a Doppler frequency component containing information relative to the nature or type of target, in combination therewith apparatus for identifying the type of target, comprising:
   a. first means included in said receiver and responsive to the reception of said returned signal for detecting the magnitude of an even harmonic component of said Doppler component at an output thereof, and
   b. means coupled to the output of said first means for providing a control signal when said magnitude of said even harmonic component exceeds a predetermined level indicative of the presence of a moving target of a given nature.

4. The apparatus according to claim 3 wherein said predetermined level is indicative of a moving target possessing a track drive.

5. The apparatus according to claim 4 wherein said even harmonic is the second harmonic.

6. The apparatus according to claim 3 wherein said first means includes a square law detector operative to provide
   a. a squared version at an output terminal of a signal applied to an input terminal thereof, and
   b. means coupled to said input of said detector and responsive to said returned signal.

7. The apparatus according to claim 3 wherein said first means, comprises:
   a. a clipper circuit responsive to said detected signal for limiting the excursions thereof within a predetermined range, and
   b. a low pass filter coupled to said clipper circuit and responsive to said limited excursion signal for providing an output signal, indicative of the average (DC) value of the same.

8. The apparatus according to claim 7 further including:
   a. a variable threshold detecting circuit responsive to a said average value to provide at an output an alarm signal when said average value exceeds a predetermined threshold limit indicative of the presence of a trackdriven vehicle.

9. In a doppler radar system of the type capable of receiving a returned doppler signal due to a transmitted reference radar signal having no harmonics, said returned signal indicative of the presence of a moving target, said returned doppler signal being a complex signal in the frequency spectrum, in combination therewith of apparatus for providing a signal indicative of the presence of one type of moving target as compared to another type, wherein said one type is a tracked driven vehicle such as a tank, comprising:
   a. first means responsive to said returned signal and operative to multiply the same by said transmitted reference signal derived from said transmitted radar signal to provide at an output the product of said reference signal and said returned signal,
   b. filter means coupled to the output of said first means for limiting the frequency band of said multiplied signal, c. detecting means coupled to said filter means and operative to provide at an output a detected version of said band limited signal, d. a waveform generator coupled to the output of said filter means and responsive to said filtered version of said signal to provide a signal at the output of said generator circuit, e. a first low pass filter connected to the output of said generator responsive to said signal at the output of said generator to provide at an output a signal representative of the average value of the same, f. a second low pass filter connected to the output of said detecting means and responsive to said detected version of said signal to provide a signal representative of the average value of the same, and g. threshold means coupled to the outputs of said first low pass filters and responsive to the average value of said output signals to provide an indication when said signals exceed predetermined levels indicative of the presence of said tracked vehicle.

10. The apparatus according to claim 9 wherein said detecting means comprises a square-law detector device.

11. The apparatus according to claim 9 further comprising:

a. a second low pass filter coupled to said detecting means to provide at an output a status signal representative of the presence of a moving target, and b. a threshold detector coupled to said second low pass filter and responsive to said status signal exceeding a predetermined level to provide at an output a signal indicative of the presence of a moving target.

12. The apparatus according to claim 11 further comprising:

a. a coincidence gate having one input responsive to said output of said threshold means providing said indicating signal, and another input responsive to said threshold detector providing said status signal to provide a level at an output thereof indicative of the presence of both signals, and b. means responsive to said level to provide an alarm signal indicating the presence of a moving tracked vehicle.

13. A method of distinguishing moving tracked vehicles from other moving targets in the beam of a C.W. radar set comprising:

radiating a pure continuous wave signal and receiving target echoes;

mixing said target echoes with a sample of said radiated signal to produce Doppler signals indicative of moving targets;

measuring the ratio of the magnitude of the second harmonic of said Doppler signals relative to the fundamental thereof;

comparing the value of said ratio to a predetermined level in order to establish the presence of a tracked vehicle.

* * * * *